May 19, 1936.    F. GRAY    2,041,127
TELEVISION
Filed Jan. 7, 1932    3 Sheets-Sheet 1
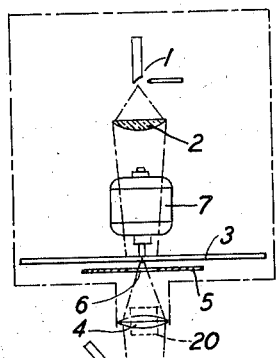
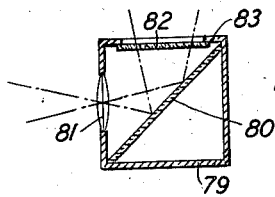
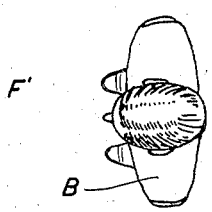
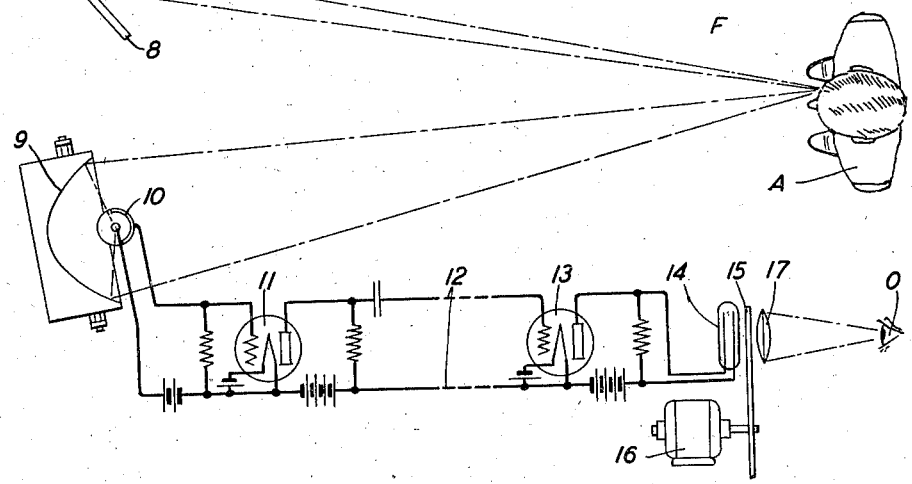
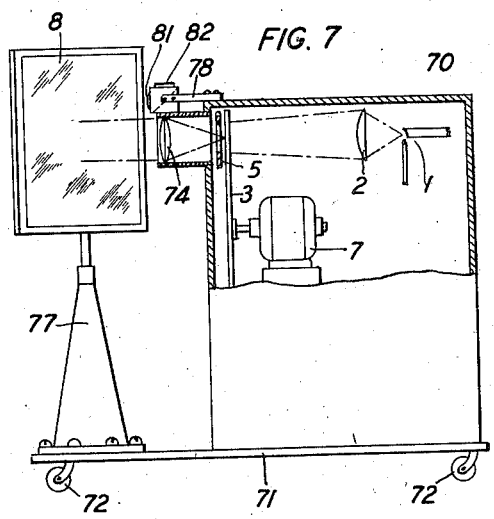
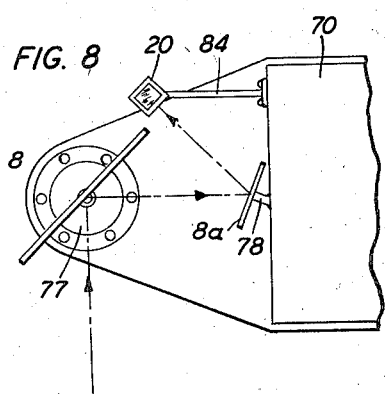
INVENTOR
F. GRAY
BY J. F. Neville
ATTORNEY May 19, 1936.                F. GRAY                2,041,127
                            TELEVISION
                    Filed Jan. 7, 1932            3 Sheets-Sheet 2

INVENTOR
F. GRAY
BY *J. P. Neville*
ATTORNEY

May 19, 1936. F. GRAY 2,041,127

TELEVISION

Filed Jan. 7, 1932 3 Sheets-Sheet 3

INVENTOR
F. GRAY
BY J. P. Neville
ATTORNEY

Patented May 19, 1936

2,041,127

UNITED STATES PATENT OFFICE 2,041,127

TELEVISION

Frank Gray, New York, N. Y., assignor to Bell Telephone Laboratories, Incorporated, New York, N. Y., a corporation of New York Application January 7, 1932, Serial No. 585,208

17 Claims. (Cl. 178—6)

This invention relates to television and more particularly to means for quickly orienting a moving beam of light to enable any desired portion of a field of view to be scanned.

Objects of the invention are to provide means for illuminating elemental areas of a field of view in succession by means of a moving beam of light including means for quickly shifting the general direction of the scanning beam, and to provide, as an adjunct to such means, a light collecting means which is automatically oriented when the direction of the scanning beam is changed.

Another object is the provision of means for indicating the general direction of the scanning beam.

One method of television scanning involves the use of a rotating disc provided with a spiral row of apertures through each of which light from the source passes at successive instants of time to produce a moving beam of light of great intensity. This beam illuminates the elemental areas of the field of view in succession. Light sensitive means are provided for collecting light reflected from the object or objects in the field of view for setting up the image currents. It is highly desirable to collect the reflected light within a large solid angle having its vertex at the illuminated elemental area from which the light is being received. A system of this kind is disclosed in the application of Frank Gray Serial No. 227,649, filed October 1, 1927.

The elements of such a scanning system may be assembled on the same support and made portable for televising outdoor scenes such as ball games, for example, or large indoor scenes such as theatrical productions. The operator of this apparatus should be able quickly to shift the general direction of the scanning beam from one portion of the general field of view to another. It has been found, however, that shifting the scanning apparatus is not practical, because of the strain put upon the scanning disc by its gyroscopic action and also because of the resistance to movement introduced by the gyroscopic force.

In accordance with the present invention this difficulty is overcome by providing a mirror mounted for universal movement in the path of the scanning beam and having associated therewith means for indicating the direction of the path of the scanning beam. This means may be a view finder of ordinary type.

Reflected light from the objects in the field may be received upon a photoelectric cell or cells of wide aperture permanently positioned above or at one side of the field of view, or such cells may be located in the vicinity of the scanning apparatus and may be mounted upon the same support. To enable light within a large solid angle to be utilized without employing cells of large aperture a concave reflector may be used with a cell of relatively small aperture mounted at its focus. It then becomes necessary to provide means for orienting the reflector with respect to the portion of the field which is at any time being scanned. In a preferred arrangement such a reflector is mounted upon the support for the scanning apparatus, and a means is provided to mechanically couple the reflector with the mirror which directs the scanning beam, whereby the reflector is automatically positioned to receive light from the portion of the field which is being scanned.

A detailed description of the invention follows and is illustrated in the attached drawings in which:

Fig. 1 is a schematic view of a television system utilizing the present invention;

Figs. 7 and 8 show details of the apparatus; and

Fig. 9 illustrates a direction finder.

Figure 2:
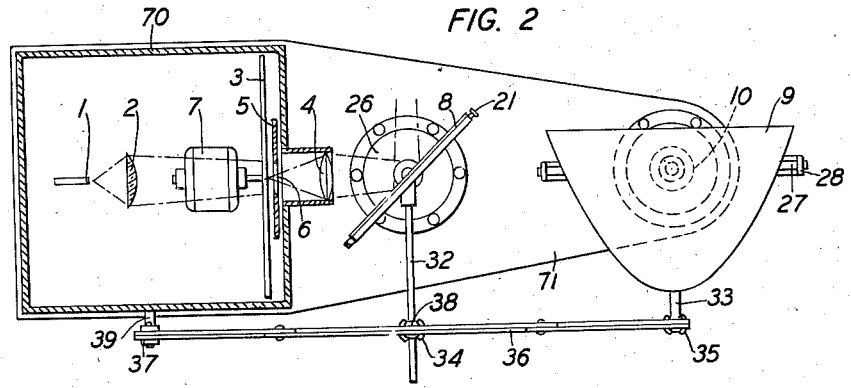
Figs. 2 and 3 are plan and elevational views, respectively, of parts of the apparatus of Fig. 1, including means for simultaneously controlling the mirror and reflector.

Let it be assumed that the field of view to be scanned for transmission comprises a scene on a stage including a number of actors.

As shown in Fig. 1, light supplied by a source 1 is gathered by a lens 2 and applied to a disc 3 provided adjacent its periphery with a row of apertures arranged in a spiral line. Associated with the disc 3 is a mask 5 having an opening 6 which determines the size of the field scanned, and the disc 3 is driven by a motor 7 to cause successive elemental areas of the field of view to be scanned once per revolution of the disc and at a rate within the period of persistence of vision. As thus far described, the apparatus operates as disclosed in the above mentioned application of Gray to produce a moving beam of light of great intensity which is directed by a plane mirror 8 to scan successive elemental areas of the portion of the field of view F, herein shown as occupied by one of the actors (A). Light reflected from the section of the field F will be gathered by the reflector 9, which may be of the type used in searchlights, and directed to a light sensitive tube 10 fixedly mounted at the focus of the reflector 9. The light sensitive tube will be thereby activated to cause the production of an image current which varies in amplitude in accordance with the tone values of successive elemental areas of the section F.

The image current is amplified by the device 11 and supplied to a transmission circuit, herein shown by way of example, as a line 12 extending to a receiving station, wherein it is amplified by device 13 and supplied to a lamp 14, for example, a glow lamp. While a suitable lamp for this purpose is disclosed in an application of H. W. Weinhart, Serial No. 441,792, filed April 5, 1930, now Patent No. 1,918,309, granted July 18, 1933, any other lamp adapted to follow the variations of the image current may be used.

Associated with lamp 14 is a rotating disc 15, having a row of apertures arranged in a spiral line and adapted to be rotated by a motor 16, and a lens system, indicated by a lens 17, through which an observer O may view the image produced by the cooperative action of the lamp and disc.

Disc 15 should be rotated in synchronism and in phase with the disc 3 of the transmitting scanning apparatus. A suitable system for this purpose is disclosed in an application of H. M. Stolier, Serial No. 442,564, filed April 8, 1930, now Patent No. 1,999,376, granted April 30, 1935.

The transmission circuit 12 may be connected to a modulator in which the image current is combined with a carrier current to produce a modulated carrier wave for transmission over a line or by radio.

So long as the actor A occupies a fixed position on the stage, the transmitting scanning apparatus will operate as described above. However, if the actor moves about, or a second actor B takes up the dialogue, it will be necessary to change the direction of the scanning beam to follow the movements of the former or to illuminate elemental areas of the portion of the field F' occupied by the latter. Since the disc 3 is rotating at a relatively high speed, there will be produced a gyroscopic action which not only causes a considerable strain to be applied to the disc itself, but such action opposes bodily movement of the scanning apparatus. Because of the gyroscopic action and the size and weight of apparatus, it is impractical to effect rapid adjustment of the scanning beam by bodily shifting the apparatus. To obviate this difficulty, the mirror 8 for directing the moving beam of light is mounted on a support for universal adjustment, as shown, for example, in Figs. 2, 3, and 5, whereby the mirror may be rapidly adjusted about either its horizontal axis or vertical axis or simultaneously about both axes.

A direction finder 20 of any suitable design, for example as shown in Fig. 9, may be provided to indicate to an operator the position of the path of the beam and hence enable him to adjust the reflector 9 into the path of the light reflected from the portion of the field being scanned by the moving beam of light. The direction finder of Fig. 9 comprises a casing 79 enclosing a reflector 80 so positioned that light directed thereto by the lens 81 in the front wall of the casing is reflected to the window 82 in the top wall 83.

To enable the operator to observe the position of the scanning beam, the direction finder 20 is placed in such position with respect to mirror 8 that the latter serves to reflect to the direction finder the portion of the scene illuminated by the moving beam of light for all adjustments of the mirror. For example, the direction finder 20 may be placed adjacent the path of the moving beam of light issuing from the scanning mechanism as indicated in Fig. 1. A practical arrangement for this purpose, associated with a cabinet 70 for enclosing the scanning mechanism is shown in Fig. 7. Cabinet 70 is mounted on a platform having an extended portion carrying a heavy standard 77 upon which the mirror 8 is mounted by means of a universal joint, and also with a bracket 78 adapted to support the direction finder 20 immediately above the lens 74 through which the beam of light passes to the mirror 8. The lens 81 of the direction finder is directed toward the mirror 8 and an operator looking through its window 82 sees an image of the portion of the field illuminated by the moving beam of light. The difference in the positions of the range finder 20 and the lens 74 is similar to that between the range finder and lens of a camera and hence introduces no greater error.

If it is desirable to have the direction finder in a position remote from the scanning mechanism the arrangement shown in Fig. 8 may be used. This apparatus embodies a mirror 8a which may be placed adjacent the path of the moving beam of light to cooperate with the mirror 8. In this case, the mirror 8 is mounted for universal movement on the heavy standard 77, the mirror 8a may be mounted on the bracket 78, and the direction finder may be secured to an arm 84 mounted on the cabinet 70. The portion of the field illuminated by the moving beam of light is reflected by the mirrors 8 and 8a to the direction finder 20 and may be seen through the window 82 by the operator.

Obviously, the mirror or mirrors may be mounted on a panel either secured to the cabinet 70 or supported independently thereof.

Preferably, the reflector 9 should be mechanically connected to the mirror 8, so that, as the mirror is adjusted to direct the beam of light, the reflector will be similarly actuated to occupy a position in the path of the light reflected from the subject or field being scanned. Alternative means for this purpose are shown in Figs. 2, 3, and 4 and in Fig. 5.

Figure 3:
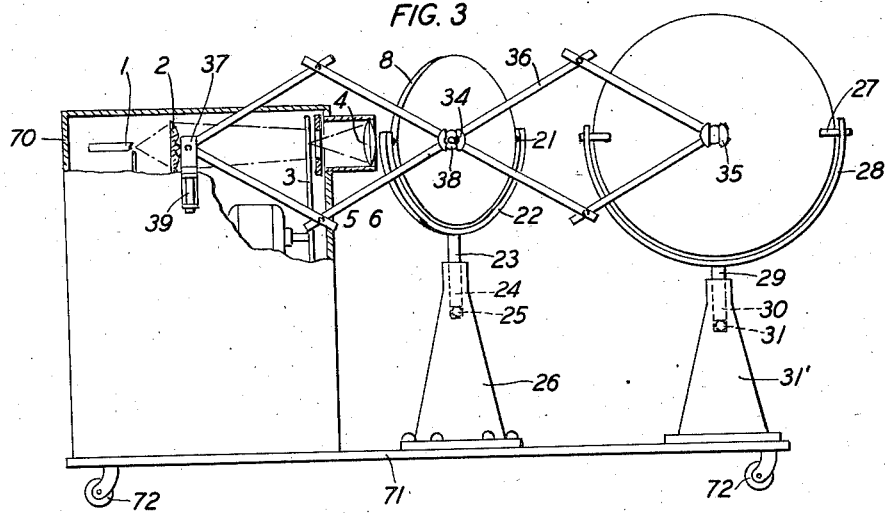
Figure 4:
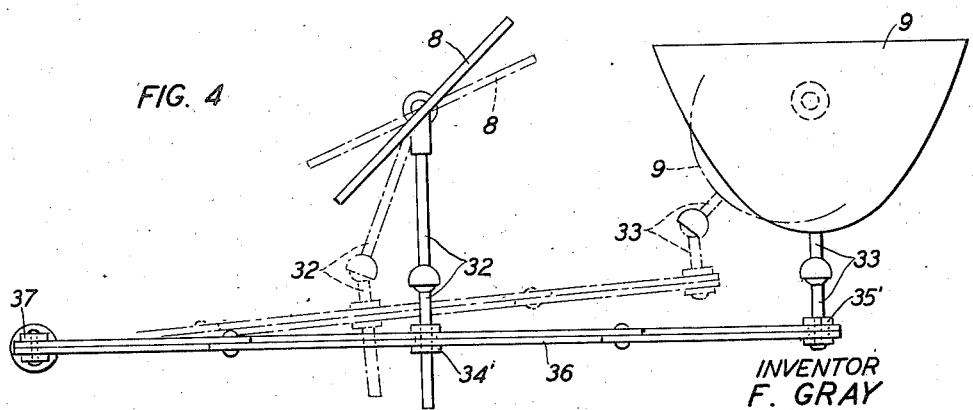
Fig. 4 is a plan view of a slightly different arrangement from that shown in Figs. 2 and 3.

Figs. 2 and 3 illustrate the source 1, lens 2, disc 3, lens 4, for directing the light beam passing through the apertures in the disc 3 to the mirror 8 which directs it to the field of view. Light reflected from this field is gathered by the reflector 9 which directs it to the photoelectric tube 10.

Mirror 8 is pivotally mounted in bearings 21 carried by a frame 22 supported by arm 23, the end 24 of which is mounted in a step-bearing 25 in a heavy standard 26 carried by an extension of the platform on which the cabinet 70, enclosing the scanning mechanism, is mounted. This method of mounting permits the mirror to be oscillated vertically about the bearings 21 and to be rotated horizontally with respect to the bearing 25. In a similar manner the projector 9 is pivotally mounted by the trunnions 27 in a frame 28, carried by an arm 29 having a reduced end 30 which projects into a step-bearing 31 in a heavy standard 31'.

The mirror and reflector are respectively provided with arms 32 and 33 which extend horizontally into engagement with bearings 34 and 35 respectively carried by a pantograph 36, having one end pivotally connected to a support 37 rotatably mounted in a bearing in the bracket 39 secured to the cabinet 70. The bearing 34 comprises an apertured ball 38 seated in a substantially spherical casing 34, so that the arm 32 is free to slide transversely with respect to the pantograph and the latter may be rotated relative to the arm 32 without binding. The arm 33 terminates in a ball which is freely movable in the bearing 35.

As the pantograph is adjusted longitudinally thereof, the mirror and projectors are simultaneously rotated about their step-bearings, 25 and 31, respectively, and the support 37 rotates about its bearing in the bracket 39. By rotating the pantograph about its pivotal connection with the support 37, i. e., up or down as shown in Fig. 3, the mirror and projector are simultaneously oscillated about their trunnions 21 and 27. Obviously both adjustments may be simultaneously made. In this manner, the mirror may be actuated to change the direction of the movable scanning beam, and the projector may be correspondingly moved to occupy a position in the path of the light reflected from the field scanned. Hence the mirror and projector may be jointly adjusted to follow the more or less continuous movements of the subject, or subjects, being scanned in one part of the field, or they may be abruptly shifted from one portion of the field to another.

Since the axis of the light reflected from the field moves through twice the angle of movement of the scanning beam, the projector 9 must be rotated and oscillated through an angle which is twice the angle of rotation and oscillation of the mirror. To effect this, the projector control arm 33 is connected to the pantograph at a point 35, the distance of which, from the support 37, is twice as great as that between this support and the point 34 at which the mirror control arm 32 is connected to the pantograph. This method of jointly controlling the adjustment of the mirror and projector will be reasonably accurate over a 45° field and by mounting them on heavy standards the effect of vibration, which would cause distortion of the reproduced image, is reduced to a minimum.

In accordance with Fig. 4 the rods 32 and 33, for respectively connecting the mirror 8 and the projector 9 to the pantograph 36, are each made in two parts coupled by a ball and socket joint. Rod 32 is free to slide in the bearing 34' while rod 33 is secured in the bearing 35'. As in Fig. 2, light from the source 1 is directed by a lens system and the apertured disc 3 in the form of a narrow beam to the mirror 8 and thence to the field of view to be scanned, and the pantograph is adjustable about the support 37.

Figure 5:
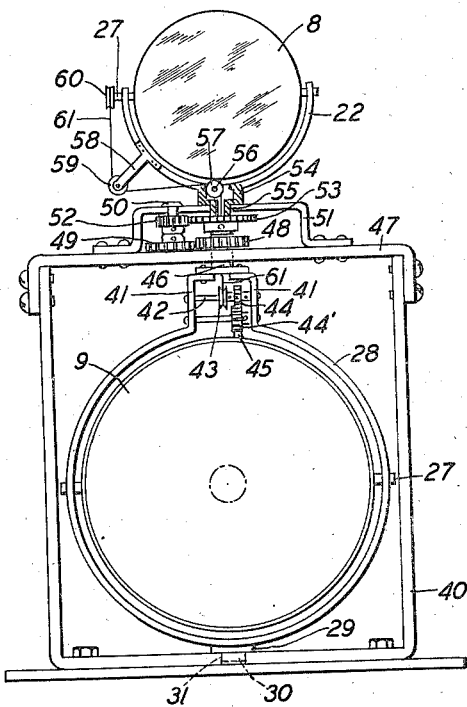
Fig. 5 shows an alternative for the apparatus shown in Figs. 2 and 3.

A more effective arrangement for properly orientating the mirror and projector is shown in Fig. 5. In this figure the projector 9 is mounted by trunnions 27 on its frame 28, provided with a supporting standard 29, having an extension 30 engaging a step-bearing 31 carried by the base which constitutes one element of a housing 40.

The frame 28 extends completely around the projector 9 and is provided at a point diametrically opposite the standard 29, with extensions 41 carrying a stub-shaft 42 upon which is fixedly mounted a pulley 43 and a gear 44. The latter engages a gear 44' meshing with a segmental gear 45 secured to the external wall of the projector. Mounted on the extensions 41 and in line with the pulley 43 is a hollow shaft 46 which extends through the member 47 of the housing 40 and is provided with a gear 48 engaging a gear 49 carried by a stub-shaft 50 mounted in bearings respectively in the member 47 and a bracket 51 secured to this member. The shaft 50 carries a second gear 52 adapted to engage a gear 53, secured to a hollow extension 54 of the frame 22 which carries the mirror 8, this extension projects through a bearing 55 in the bracket 51.

Frame 22, carrying the mirror, is provided with a rod 56 on which a pulley 57 is loosely mounted, a bracket 58 carrying a second pulley 59 and one of the trunnions 27 projects beyond the frame 22 and a pulley 60 is secured thereto. A driving belt 61 engages the pulley 43, passes through the hollow extensions 46 and 54, over the pulleys 57, 59, and 60.

The gear train comprising gears 48, 49, 52, and 53 have a 2 to 1 ratio, so that as the mirror is rotated about its extension 54 the projector 9 will be caused to rotate about its bearing 30 by twice the angle of movement of the mirror 8.

As the mirror 8 is oscillated about its trunnions 22, the projector 9 will be similarly oscillated by the driving belt 61 and gear connection 44—44'—45, which has a ratio such that the projector rocks about its trunnions 27 through an angle which is twice as great as the angular movement of the mirror.

Figure 6:
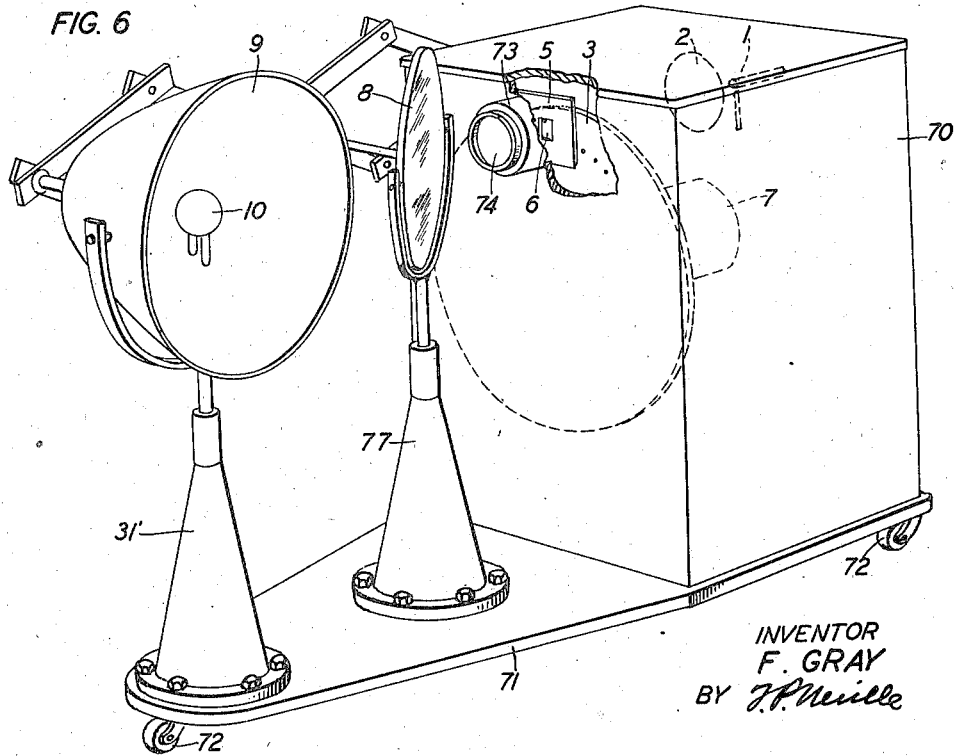
Fig. 6 illustrates a portable television transmitter which may be used in practising the invention.

The transmitting terminal apparatus described above may be made portable, as shown in Fig. 6, by mounting the cabinet 70 on a platform 71 provided with casters or wheels 72. The light source 1, lens 2, scanning disc 3, mask 5 and motor 7, as well as the necessary auxiliary apparatus, including, if desired, switches, fuses, synchronizing apparatus, etc., are enclosed in the cabinet 70. The standard 77 and 31' for the mirror and projector, respectively, are mounted on an extension of the platform 71 and the pantograph is associated with the mirror 8 and projector 9 as shown in Figs. 2 and 3 or in Fig. 4. The cabinet is provided with an extension 73 carrying the lens 74 for directing the beam of light, passing through the apertures of the scanning disc 3, to the mirror 8.

The housing 40 of Fig. 5, may be secured in any suitable manner to the front wall of the cabinet, or to a separate member connected thereto, but always so that the mirror 8 is in line with the lens 74. Again the mirror and projector may be mounted on the platform so that they may be operated separately as indicated in Fig. 1, or jointly by the pantograph control shown in Figs. 2, 3, and 4.

The castors permit the cabinet to be adjusted with respect to the field to be scanned for transmission before the scanning operation is started, but, once this has begun, the scanning beam is directed to different portions of the field by rotating and oscillating the mirror and projector either separately or jointly by the control means illustrated in Figs. 2, 3, and 4 or that shown in Fig. 5.

This invention may also be used to control the scanning of a field of view which is flood-lighted. In this case, if artificial light is used, an arc or other intense source of light is mounted in the focus of the reflector 9, the scanning disc 3 is positioned between the mirror and the light sensitive electric tube, and a lens is used, between the mirror 8 and the disc, to produce an image of the section of the field being scanned in the plane of the disc, whereby light, varying as the tone values of the elemental areas of the field, will pass through the apertures in the disc to a light sensitive electric means.

What is claimed is:

1. Television scanning apparatus comprising a rotating scanning member, optical means adjustable independently of said scanning member to permit said apparatus to be effectively oriented while maintaining it in fixed position with respect to a field of view, and means, utilizing light received thereby from said optical means, for enabling the operator to determine when said optical means is properly adjusted with respect to said field.

2. Television scanning apparatus comprising means for producing a narrow beam of light and for causing it to move progressively over the elemental areas of a field of view comprising a source of light and a rotating scanning element, a mirror mounted for universal movement for deflecting said beam, means for manually adjusting said mirror to direct said beam toward an object to be scanned, and means utilizing light received thereby from said mirror for enabling an operator to determine when said mirror is properly positioned to give said beam a desired direction.

3. Television scannning apparatus comprising means for producing a narrow beam of light and means for causing it to move progressively over the elemental areas of a field of view comprising a source of light and a rotating scanning element, a mirror mounted for universal movement for deflecting said beam, a concave reflector mounted for universal movement for receiving light reflected from the field, and means for coupling said mirror and said reflector to automatically orient the major axis of said reflector toward a portion of the field of view which is being illuminated by said beam.

4. Television scanning apparatus comprising means for producing a narrow beam of light and means for causing it to move progressively over the elemental areas of a field of view comprising a source of light and a rotating scanning element, a mirror mounted for universal movement for deflecting said beam, a concave reflector mounted for universal movement for receiving light reflected from the field, and means for coupling said mirror and reflector to jointly orient them for directing said beam toward a portion of said field of view and the major axis of said reflector toward the portion of said field illuminated by said beam.

5. Television scanning apparatus comprising means for producing a narrow beam of light and means for causing it to move progressively over the elemental areas of a field of view comprising a source of light and a rotating scanning element, a mirror mounted for universal movement for deflecting said beam, a concave reflector mounted for universal movement for receiving light reflected from the field, and a lever mechanism for coupling said mirror and said reflector to automatically orient the major axis of said reflector toward a portion of the field of view which is being illuminated by said beam.

6. Television scanning apparatus comprising means for producing a narrow beam of light and means for causing it to move progressively over the elemental areas of a field of view comprising a source of light and a rotating scanning element, a mirror mounted for universal movement for deflecting said beam, a concave reflector mounted for universal movement for receiving light reflected from the field, and a driving gear for coupling said mirror and said reflector to automatically orient the major axis of said reflector toward a portion of the field of view which is being illuminated by said beam.

7. Television scanning apparatus comprising means for producing a narrow beam of light and means for causing it to move progressively over the elemental areas of a field of view comprising a source of light and a rotating scanning element, a mirror mounted for universal movement for deflecting said beam, a concave reflector mounted for universal movement for receiving light reflected from the field, and driving means including gearing for coupling said mirror and said reflector to simultaneously rotate them in two directions at right angles to each other to direct said beam toward a portion of said field of view and the major axis of said reflector toward the portion of said field illuminated by said beam.

8. Television scanning mechanism including a continuously rotatable scanning element and means permitting said mechanism to be effectively oriented while maintaining it in fixed position, said means including pivotally mounted light directing means for directing light to an object to be scanned, a second pivotally mounted light directing means for directing light received from said object, and means operatively associated with both said light directing means whereby when one of said means is rotated the other of said means is automatically rotated by a different amount.

9. Television scanning apparatus comprising means for producing a narrow beam of light and means for causing it to move progressively over the elemental areas of a field of view comprising a source of light, a rotating scanning element, light sensitive electric means, a rotatably mounted mirror for deflecting said beam, a rotatably mounted light directing means for directing to said light sensitive means light reflected from the field, and means operatively associated with said mirror and said light directing means whereby when one of them is rotated the other of them is automatically rotated by a different amount.

10. Television scanning apparatus, means for effectively orienting said apparatus while maintaining it in fixed position, said means comprising an adjustable mirror mounted in the path of the scanning light, and view finding means cooperating with said mirror for enabling the operator of said apparatus to adjust said mirror to bring a desired field of view into effective alignment with said apparatus and to obtain a non-inverted view of said field through said mirror.

11. The method of orienting television apparatus while maintaining it in fixed position and simultaneously producing an image of the field which is being scanned where it may be observed by an operator at the transmitting station, including light deflecting means which method comprises utilizing the light deflecting means to deflect the scanning light by an amount dependent upon the position of the field with respect to said apparatus, and simultaneously reflecting light from the field an even number of times, controlling one of such reflections by the operation of the light deflecting means, and utilizing the reflected light to form a non-inverted image of said field.

12. Television scanning apparatus, means for effectively orienting said apparatus while maintaining it in fixed position, said means comprising an adjustable mirror mounted in the path of the scanning light, and means for enabling an operator to determine when said mirror is properly adjusted comprising means utilizing light from said mirror and means between said last mentioned means and said mirror for producing an optical inversion about one axis only.

13. Television scanning apparatus comprising a rotating scanning member, optical means adjustable independently of said scanning member to permit said apparatus to be effectively oriented while maintaining it in fixed position with respect to a field of view, light sensitive electric means activated by light from said field for producing image currents, and means including said optical means for enabling the operator to determine when said optical means is properly adjusted with respect to said field.

14. Television scanning apparatus comprising means for producing a narrow beam of light and for causing it to move progressively over the elemental areas of a field of view comprising a source of light and a rotating scanning element, a mirror for deflecting said beam mounted for universal movement to direct said beam toward an object to be scanned, light sensitive electric means activated by light from said field for producing image currents, and means including said mirror for enabling an operator to determine when said mirror is properly positioned to give said beam a desired direction.

15. Television scanning apparatus comprising a rotating scanning member, a support fixed with respect to said member, optical means mounted on said support and adjustable independently of said scanning member to permit said apparatus to be effectively oriented while maintaining it in fixed position with respect to a field of view, and means, utilizing light received thereby from said optical means, for enabling the operator to determine when said optical means is properly adjusted with respect to said field.

16. Television scanning apparatus comprising means for producing a narrow beam of light and for causing it to move progressively over the elemental areas of a field of view comprising a source of light and a rotating scanning element, a support fixed with respect to said element, a mirror mounted on said support for universal movement for deflecting said beam, means for manually adjusting said mirror to direct said beam toward an object to be scanned, and means utilizing light received from said mirror for enabling an operator to determine when said mirror is properly positioned to give said beam a desired direction.

17. Television scanning apparatus comprising means for producing a moving beam of light for scanning a field of view, a cabinet enclosing said means, an opening in said cabinet through which said beam emerges, and means for effectively orientating said apparatus while maintaining it in fixed position, said means comprising an adjustable mirror mounted in the path of said emerging beam, and means for enabling an operator to determine when said mirror is properly adjusted comprising a second mirror between said first mentioned mirror and said cabinet.

FRANK GRAY.